L. HORNBLOWER.
FIRE-PROOF BUILDING.
No. 177,516.                           Patented May 16, 1876.
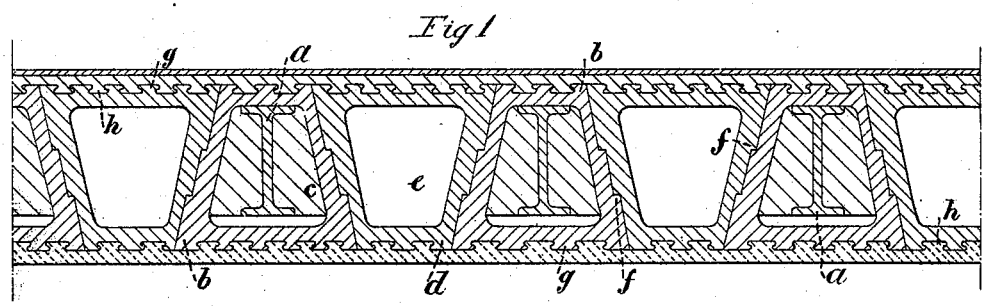
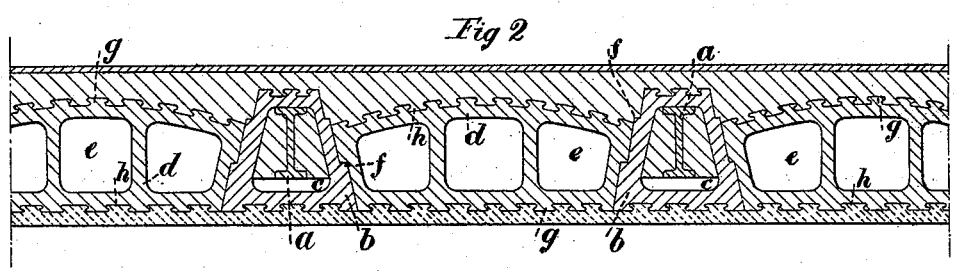

UNITED STATES PATENT OFFICE.

LEWIS HORNBLOWER, OF LIVERPOOL, ENGLAND.

IMPROVEMENT IN FIRE-PROOF BUILDINGS.

Specification forming part of Letters Patent No. 177,516, dated May 16, 1876; application filed April 5, 1876.

*To all whom it may concern:*

Be it known that I, LEWIS HORNBLOWER, of Liverpool, in the county of Lancaster, England, have invented Improvements in Fire-Proof Buildings, of which the following is a specification:

My invention has for its object so to construct walls, partitions, floors, roofs, and other parts of buildings that they shall be at once light, strong, cheap, durable, thoroughly fire-proof, and convenient for ventilating the rooms or spaces they inclose; and consists in employing, in combination, wood or metal supporting or carrying agents, hollow earthenware, and concrete or cement, in manner following: First, as means for protecting wood or metal girders, joists, rafters, pillars, and other carrying and supporting agents from fire, I inclose them each in hollow earthenware or clay pipes or tiles, preferably made in lengths and jointed together. The space between the wood or metal supporting or carrying agent and its inclosing earthenware may contain air or water; or it may, if desired, be filled with concrete, cement, or non-conducting substance. Second, as means for securing lightness in floors and roofs under my invention, I construct such floors or roofs alternately of lengths of metal inclosed in hollow earthenware, under the above first head of my invention, and hollow earthenware either filled with concrete, cement, or non-conducting material; or, if desired, the interior of such hollow earthenware may contain air or water. Third, as means for securing strength in floors and roofs constructed under the above first and second heads, I form the hollow earthenware of a wedge or stepped form in transverse section, so as to provide, when fitted side by side, the strength and the advantages of an arch.

Figures 1 and 2 are views in transverse section, illustrative of my invention.

The construction shown in Fig. 1 is suitable for walls, floors, and other parts of buildings requiring considerable strength. The construction shown in Fig. 2 is suitable for partitions, roofs, and other parts of buildings requiring but moderate strength.

Under the first part of my invention, $a$ is a metal supporting or carrying agent inclosed in hollow earthenware $b$; $c$, space containing concrete or cement filling. A wood supporting or carrying agent may be used, and the space $c$ may contain air or water, or be filled with non-conducting material.

Under the second part of my invention, $d$ is the alternate length of hollow earthenware, which does not contain a carrying or supporting agent. The space or spaces $e$ may be used for ventilating, may contain water, or may be filled with concrete, cement, or non-conducting material.

Under the third part of my invention, the hollow earthenware is formed wedge-like, and $f$ are step-like projections for strengthening. $g$ $h$ are ordinary dovetail grooves and key projections for retaining the plaster, concrete, cement, or other suitable material in position. Where very strong construction is desired, a carrying or supporting agent is placed through each earthenware-inclosed space.

Having now described the nature of my said invention, and particularized the same in such manner that others will be enabled to construct fire-proof buildings in accordance with my invention, I claim—

1. The combination of girder $a$ and hollow earthenware or clay pipes $b$, the former being inclosed within the hollow or tubular space of the latter, substantially as set forth.

2. The pipes or tile $b$, containing girder $a$ in the hollow or tubular openings of the same, alternately arranged with pipe or tile $d$, without girders therein, substantially as set forth.

3. The pipes or tile $b$ $d$, made wedge-shaped in cross-section, with steps $f$ in the inclined lateral faces, in combination with a concrete filling between such pipes or tubes, and engaging the steps, substantially as set forth.

LEWIS HORNBLOWER.

Witnesses:
WILLIAM HETHERINGTON,
FREDERIC W. HORNBLOWER.